3,268,545
CERTAIN 4,8-DICHLORO-2,6-DISUBSTITUTED BENZO[1-2,4-5]BISOXAZOLE COMPOUNDS
Morton H. Litt and Albert L. Idelson, Morristown, N.J., assignors to Allied Chemical Corporation, New York, N.Y., a corporation of New York
No Drawing. Filed Apr. 17, 1964, Ser. No. 360,745
7 Claims. (Cl. 260—307)

This invention relates to novel benzoxazole compounds and the preparation thereof. More particularly this invention relates to novel compounds having a chlorinated benzobisoxzol nucleus.

The novel compounds of the invention are useful as stabilizers against effects of temperature for polymeric compositions and are particularly effective as stablizers for chlorinated organic compounds.

It is an object of this invention to provide novel benzobisoxazole compounds and methods for their preparation.

Another object of this invention is to provide heat stable compounds having a chlorinated benzobisoxazole nucleus which are useful as thermal stabilizers for polymeric compositions.

Additional objects and advantages of this invention will become apparent from the following detailed description thereof.

In accordance with the present invention there are provided novel compounds having a chlorinated benzobisoxazole nucleus of the following formula:

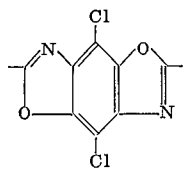

These compounds include both compounds of the formula:

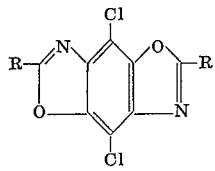

where R is a member selected from the class consisting of lower alkyl, halo-substituted lower alkyl, and phenyl-lower alkyl radicals and polymers composed of recurring units of the formula:

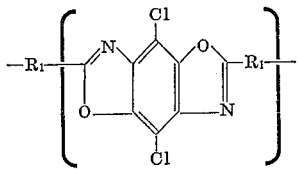

where $R_1$ is a member selected from the class consisting of lower alkylene and arylene radicals.

The nomenclature hereinafter used in referring to the benzobisoxazole compounds of the invention is in accordance with The Ring Index, by Patterson and Capell (1940), page 189, compound No. 1331. By this system of nomenclature a compound of the formula:

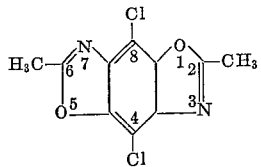

is designated 4,8-dichloro-2,6-dimethylbenzo [1-2,4-5] bisoxazole. The pairs of numbers inside the brackets indicate both that the oxazole rings are fused to sides 1–2, and 4–5 of the benzene ring relative to the conventional numbering of a benzene ring, and that the numbering of the oxazole rings runs in the same direction as the numbering of the benzene ring. The remaining numbers in the compound name indicate the positions of the substituents relative to the numbers in the above given structural formula.

The compounds of the present invention can be prepared by reacting 2,5-diamino-3,6-dichlorohydroquinone dihydrochloride with a monocarboxylic acid or an anhydride thereof, as illustrated by the equation:

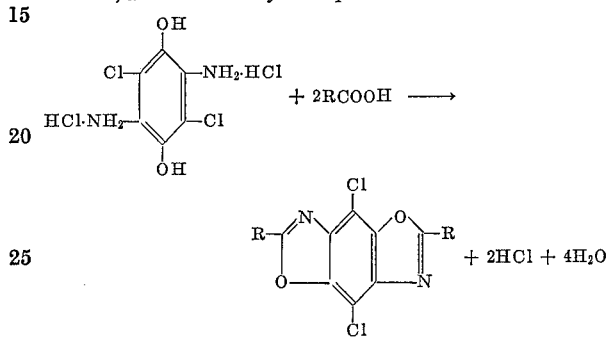

wherein R has the meaning given above; while the polymers of the present invention can be prepared by reacting 2,5-diamino-3,6-dichlorohydroquinone dihydrochloride with a dicarboxylic acid or an anhydride thereof whereby the presence of a second functional group results in the formation of a polymeric chain. The monocarboxylic and dicarboxylic acids can be replaced, if desired, with their respective acyl halides and esters.

In prepariing both the compounds and the polymers, the reaction is preferably carried out in the presence of a condensing agent. If both of the reactants are solids, a solvent should be used. Excellent results are obtained when the reactants are dissolved in polyphosphoric acid which acts both as a solvent and a condensing agent. The amount of polyphosphoric acid used is not critical, and can range from about 5 to 100 parts by weight for each part by weight of 2,5-diamino-4,6-dichlorohydroquinone dihydrochloride. The reactions are preferably conducted under an inert atmosphere such as nitrogen or argon. In general the reaction to form the model compounds can be conducted at temperatures between about 20 to 150° C., while the reaction to form the polymers can be conducted at temperatures between about 100 to 250° C.

The 2,5 - diamino-3,6-dichlorohydroquinone dihydrochloride, a known compound, used in the process of this invention, can be prepared from chloranil, by a series of reactions employing sequentially, ammonia, sodium hydrosulfite, and hydrochloric acid as illustrated in the following equation:

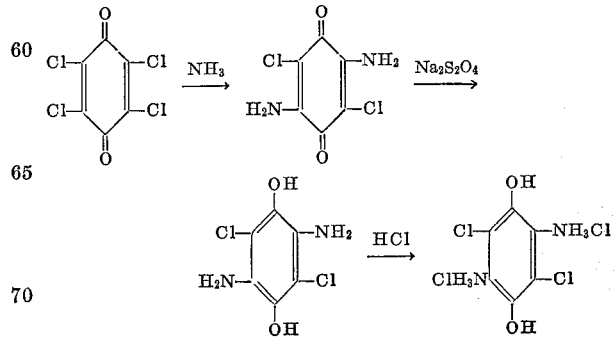

Illustrative of the compounds of the invention are:

4,8-dichloro-2,6-dimethylbenzo[1-2,4-5]bisoxazole
4,8-dichloro-2,6-diethylbenzo[1-2,4-5]bisoxazole
4,9-dichloro-2,6-di-n-pentylbenzo[1-2,4-5]bisoxazole
4,8-dichloro-2,6-diphenylbenzo[1-2,4-5]bisoxazole
4,8-dichloro-2,6-dibenzylbenzo[1-2,4-5]bisoxazole
4,8-dichloro-2,6-di(4-methylphenyl)-benzo [1-2,4-5] bisoxazole
4,8-dichloro-2,6-di-trifluoromethylbenzo [1-2,4-5] bisoxazole
4,8-dichloro-2,6-dichloromethylbenzo [1-2,4-5] bisoxazole The following polymers are illustrative of the polymers of the present invention:

poly(4,8-dichloro-2,(6)-ethylenebenzo [1-2,4-5] bisoxazole)
poly(4,8-dichloro-2,(6)-methylenebenzo [1-2,4-5] bisoxazole)
poly(4,8-dichloro-2,(6)-trimethylenebenzo [1-2,4-5] bisoxazole)
poly(4,8-dichloro-2,(6)-m-phenylenebenzo [1-2,4-5] bisoxazole)
poly(4,8-dichloro-2,(6)-p-phenylbenzo [1-2,4-5] bisoxazole).

The above listed compounds are merely given for illustrative purposes and it will be obvious that many additional compounds are within the scope of the present invention.

The polymers of the present invention are thermoplastic materials stable against the effects of exposure to heat, which can withstand temperatures of up to 375° C. Both the compounds and the polymers of this invention can be used to stabilize chlorinated organic compounds. When used as stabilizers for e.g. chlorinated polyethylene, these compounds should be added to the polymer in an amount equal to at least 0.5% by weight of the chlorinated polyethylene and preferably in an amount equal to about 1–10% by weight of the chlorinated polyethylene. In a copending application entitled Stabilized Halogen-Containing Olefin Polymer Compositions and Stabilizers Therefor, application Serial No. 360,770, filed concurrently herewith, there is exemplified the stabilization of chlorinated polyethylene samples by the addition thereto of 4% by weight of 4,8-dichloro-2,6-diethylbenzo [1-2,4-5] bisoxazole;
4,8-dichloro-2,6-dibenzylbenzo [1-2,4-5] bisoxazole; and
poly(4,8-dichloro-2,(6)-ethylenebenzo [1-2,4-5] bisoxazole).

With each of these stabilizers there was obtained a substantial decrease in the crosslinking and discoloration of the chlorinated polyethylene sample upon treatment at 200° C. for one hour.

The following examples describe specific embodiments of the invention and illustrate the best mode contemplated for carrying it out, but are not to be interpreted as limiting the invention to all details of the examples. All temperatures are given in ° C., and parts by weight and parts by volume are related to each other similar to kilograms and cubic decimeters.

*Example 1*

5.64 parts by weight 2,5-diamino-3,6-dichlorohydroquinone dihydrochloride and 2.44 parts by weight benzoic acid were mixed with 150 parts by weight polyphosphoric acid. The mixture was heated and stirred at 200° for 3 hours under a dry nitrogen atmosphere. The reaction products were then cooled to 50° and poured into a large mass of cold water. The resulting suspension was filtered and washed free of acidity and then vacuum dried at 100°. The dried product was purified by sublimation yielding 6.5 parts by weight 4,8 - dichloro - 2,6 - diphenylbenzo [1-2,4-5] bisoxazole which had a sublimation temperature of 375°. Elemental analysis of the product was as follows:

Found: C=63.68%, H=2.98% and N=7.44%. Theoretical: C=63.30%, H=2.62% and N=7.34%.

*Example 2*

2.82 parts by weight of 2,5-diamino-3,6-dichlorohydroquinone dihydrochloride and 3.92 parts by weight butyl benzoate were mixed into a paste with 50.0 parts by weight polyphosphoric acid. The mixture was heated under a nitrogen atmosphere for one hour at 100°, then for one hour at 150° and finally for one hour at 175° C. The reaction products were poured into a large mass of water and neutralized. The resulting suspension was filtered and vacuum dried yielding 3.66 parts by weight 4,8-dichloro-2,6-diphenylbenzo [1-2,4-5] bisoxazole, the same product as obtained in Example 1.

*Example 3*

5.64 parts by weight 2,5-diamino-3,6-dichlorohydroquinone dihydrochloride and 6 parts by weight phenyl acetic acid were mixed with 100 parts by weight polyphosphoric acid. The mixture was heated and stirred at 150° C. for 1½ hours under a dry nitrogen atmosphere. The reaction products were then cooled to 50°, poured into a large mass of water and neutralized with sodium bicarbonate. The resulting suspension was filtered and vacuum dried, yielding 8.5 parts by weight of 4,8-dichloro-2,6-dibenzylbenzo [1-2,4-5] bisoxazole. The material was dissolved in benzene and purified by being sent through an alumina column. The material recovered had a melting point of 237.5° C. Elemental analysis of the product was as follows:

Found: C=64.50%, H=3.40%, N=7.76%, Cl=1800%. Theoretical: C=64.50, H=3.42%, N=6.84%, Cl=17.37%.

*Example 4*

5.64 parts by weight 2,5-diamino-3,6-dichlorohydroquinone dihydrochloride and 2.6 parts by weight of propionic anhydride were mixed with 45 parts by weight polyphosphoric acid. The mixture was heated and stirred at 150° for 3 hours under a dry nitrogen atmosphere. The reaction products were then cooled to 50°, poured into a large mass of water, and neutralized. The resulting suspension was filtered and vacuum dried, yielding 5 parts by weight 4,8-dichloro-2,8-diethylbenzo- [1-2,4-5] bisoxazole having a melting point of 200°. Elemental analysis of the product was as follows:

Found: C=50.42%, H=3.52%, N=10.44%, Cl=26.1%. Theoretical: C=50.50%, H=3.51%, N=9.83%, Cl=24.9.

*Example 5*

2.82 parts by weight 2,5-diamino-3,6-dichlorohydroquinone dihydrochloride and 25 parts by weight trifluoroacetic anhydride were refluxed for one hour. A few drops of water were added and the material continued to reflux for one more hour. The mixture was heated and stirred at 200° for 6 hours under nitrogen atmosphere. During this period a total of 80 parts by weight trifluoroacetic anhydride were added in 8–16 parts by weight increments. The reaction product was then cooled to 50° and poured into a large mass of cold water. The resulting suspension was filtered and washed free of acidity. The material was precipitated from a water-acetone solution and 0.22 parts by weight 4,8-dichloro-2,6-di-trifluoromethylbenzo [1-2,4-5] bisoxazole having a melting point of 245° were recovered. Elemental analysis of the product was as follows:

Found: C=32.93%, N=7.90%. Theoretical: C=32.9%, N=7.67%.

*Example 6*

11.28 parts by weight of 2,5-diamino-3,6-dichlorohydroquinone dihydrochloride and 5.295 parts by weight crystallized glutaric acid were mixed with 200 parts by weight polyphosphoric acid and 1.5 parts of crystalline phosphorous acid. The mixture was heated at 175° C. for 2.0 hours under a dry nitrogen atmosphere. After cooling to 50° C. the solution was charged into 500 parts by volume of cold water and the resulting suspension was filtered and washed until acid free. After a methanol wash the polymer was dried overnight in a vacuum oven at 90° C. yielding 12.50 parts by weight poly(4,8-dichloro-2,(6)-trimethylenebenzo [1-2,4-5] bisoxazole) having a reduced viscosity $\eta_{sp/c}=0.53$. By the term "reduced viscosity" a value is meant which is obtained by dividing the specific viscosity by the concentration of the polymer in a solution, the solvent here being conc. $H_2SO_4$. The specific viscosity is obtained by dividing the difference between the viscosity of the solution and the viscosity of the solvent by the viscosity of the solvent. The nitrogen-carbon ratio was 0.214 as compared to a theoretical value of 0.212.

*Example 7*

5.64 parts by weight of 2,5-diamino-3,6-dichlorohydroquinone dihydrochloride and 2.60 parts by weight succinic acid, a 10% excess, were mixed with 75 parts by weight polyphosphoric acid. The mixture was kept under a nitrogen atmosphere for one hour at 100° C. then at 150° C. for an additional hour, and finally at 175° C. for 30 minutes. The resulting material was cooled to 80° and poured into a large mass of cold water. The slurry was neutralized with sodium carbonate to a pH of 8. Then the solid cake containing the product was placed in water and the slurry was acidified with acetic acid to a pH 4 and filtered. After vacuum drying, 5.0 parts by weight poly(4,8-dichloro-2,(6)-ethylenebenzo [1-2,4-5] bisoxazole) were recovered having a reduced viscosity $\eta_{sp/c}=0.06$ as determined in dimethyl sulfoxide. The nitrogen-carbon ratio was 0.21 as compared to a theoretical value of 0.23.

*Example 8*

9.87 parts by weight 2,5-diamino-3,6-dichlorohydroquinone dihydrochloride and 5.81 parts by weight isophthalic acid were mixed with 200 parts by weight polyphosphoric acid and 2 grams of crystalline phosphorous acid. The mixture was heated under a nitrogen atmosphere for one hour at 100° then for 1.75 hours at 150°, and finally for the last two hours at 175° C. The resulting material was cooled to 50° and poured in a large excess of cold water. The slurry was neutralized with sodium bicarbonate to a pH 6 and the suspension filtered. After vacuum drying the solid product, 8.74 parts by weight poly(4,8-dichloro-2,6-m-phenylenebenzo [1-2,4-5] bisoxazole) were recovered, having a reduced viscosity of 0.06, which was determined in accordance with Example 6 using conc. $H_2SO_4$ as the solvent. The nitrogen-carbon ratio was 0.180 as compared to a theoretical value of 0.167.

We claim:
1. A compound selected from the group consisting of compounds of the formula:

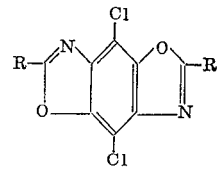

wherein R is a member selected from the class consisting of lower alkyl, halo-substituted lower alkyl, and phenyl-lower alkyl radicals; and of polymers composed of recurring units of the formula:

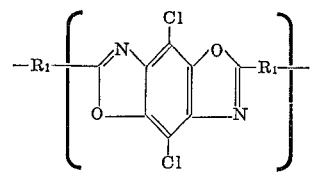

wherein $R_1$ is a member selected from the class consisting of lower alkylene, and phenylene radicals.
2. 4,8-dichloro-2,6-diethylbenzo [1-2,4-5] bisoxazole.
3. 4,8-dichloro-2,6-dibenzylbenzo [1-2,4-5] bisoxazole.
4. 4,8-dichloro-2,6-di-trifluoromethylbenzo [1-2,4-5] bisoxazole.
5. Poly(4,8-dichloro-2,(6)-trimethylenebenzo [1-2,4-5] bisoxazole).
6. Poly(4,8-dichloro-2,(6)-ethylenebenzo [1-2,4-5] bisoxazole).
7. Poly(4,8-dichloro-2,(6)-m-phenylenebenzo [1-2,4-5] bisoxazole).

References Cited by the Examiner

UNITED STATES PATENTS 2,876,231  3/1959  Horwitz _____ 260—307.4
2,985,661  5/1961  Hein et al. _____ 260—307.4

OTHER REFERENCES

Osman, J. Am. Chem. Soc., vol. 79, pages 966–968 (1957).

ALEX MAZEL, *Primary Examiner.*

HENRY R. JILES, *Examiner.*

ALTON D. ROLLINS, *Assistant Examiner.*